US012709940B2

(12) United States Patent
Rhynard et al.

(10) Patent No.: US 12,709,940 B2
(45) Date of Patent: Aug. 18, 2026

(54) DOOR ASSEMBLY WITH AN ENGAGEMENT MECHANISM

(71) Applicants: The Boeing Company, Arlington, VA (US); Harper Engineering Company, Renton, WA (US)

(72) Inventors: Steven Ellis Rhynard, Mukilteo, WA (US); David Lee Chadwell, Renton, WA (US)

(73) Assignees: THE BOEING COMPANY, Arlington, VA (US); HARPER ENGINEERING COMPANY LLC, Renton, WA (US)

( * ) Notice: Subject to any disclaimer, the term of this patent is extended or adjusted under 35 U.S.C. 154(b) by 168 days.

(21) Appl. No.: 18/619,653

(22) Filed: Mar. 28, 2024

(65) Prior Publication Data

US 2025/0305348 A1 Oct. 2, 2025

(51) Int. Cl.
*E06B 3/48* (2006.01)

(52) U.S. Cl.
CPC ........... *E06B 3/481* (2013.01); *E05Y 2201/22* (2013.01); *E05Y 2900/132* (2013.01)

(58) Field of Classification Search
CPC E06B 3/481; E05Y 2201/22; E05Y 2900/132
USPC .......................................................... 160/199
See application file for complete search history.

(56) References Cited

U.S. PATENT DOCUMENTS 2,202,916 A * 6/1940 Mussa ....................... E05C 7/06 292/179
7,051,780 B2 * 5/2006 Csik ...................... B64C 1/1469 160/206
9,428,940 B1 * 8/2016 Patrick ....................... E05C 1/16
9,518,421 B2 * 12/2016 Cushwa, Jr. .............. E06B 9/02
12,434,856 B2 * 10/2025 Nunes ................ B64D 45/0021
(Continued)

FOREIGN PATENT DOCUMENTS

| | | | |
|---|---|---|---|
| DE | 19634390 | A1 | 3/1998 |
| EP | 3546690 | B1 | 3/2021 |
| WO | 2016076720 | A1 | 5/2016 |

OTHER PUBLICATIONS

EP Search Report mailed Jun. 25, 2025 in re EP Application No. 25155210.5.

*Primary Examiner* — Kristina R Fulton
(74) *Attorney, Agent, or Firm* — COATS & BENNETT, PLLC

(57) ABSTRACT

A door assembly configured to be mounted in an opening and configured to control movement of persons through the opening. The door assembly includes a door within pivoting first and second panels. A translating rod is mounted to the second panel and is movable between a first lateral position with an end extending outward from the inner edge of the second panel and a second lateral position that is laterally offset from the first lateral position. A plunger is mounted to the second panel and is movable between a first vertical position with the plunger end disengaged from the opening and a second lateral position with the plunger end extending outward from the second panel and engaged with the opening. A gear assembly is configured to move the plunger to the first vertical position when the lever is in the first horizontal position and to move the plunger to the second vertical position when the translating rod is in the second horizontal position.

20 Claims, 12 Drawing Sheets

(56) References Cited

U.S. PATENT DOCUMENTS

| | | | | |
|---|---|---|---|---|
| 2002/0092951 | A1* | 7/2002 | Haviv | B64C 1/1469 244/118.5 |
| 2003/0052227 | A1* | 3/2003 | Pittman | B64D 45/0026 244/118.5 |
| 2003/0080249 | A1* | 5/2003 | Raczkowski | B64C 1/1469 244/118.5 |
| 2003/0122036 | A1* | 7/2003 | Artsiely | B64D 45/0028 244/129.4 |
| 2003/0183350 | A1* | 10/2003 | Goldsmith | E05D 15/26 160/199 |
| 2003/0184097 | A1* | 10/2003 | Csik | E05B 65/0085 292/138 |
| 2006/0000946 | A1* | 1/2006 | Garofani | B64D 11/00 52/64 |
| 2010/0259052 | A1* | 10/2010 | Lin | E05C 7/06 292/56 |
| 2016/0083092 | A1* | 3/2016 | Long | B64D 11/02 160/213 |
| 2016/0194068 | A1* | 7/2016 | Savian | B64C 1/1461 160/213 |
| 2019/0144098 | A1* | 5/2019 | Gallagher, Jr. | E05D 15/0604 244/118.5 |
| 2020/0108907 | A1* | 4/2020 | Movsesian | B64D 45/0026 |
| 2020/0115029 | A1* | 4/2020 | Movsesian | B64D 11/02 |
| 2021/0291955 | A1* | 9/2021 | Breigenzer | E06B 5/125 |
| 2022/0355949 | A1* | 11/2022 | Reinck | E05B 83/00 |
| 2023/0046401 | A1* | 2/2023 | Mitchell | E05D 7/009 |
| 2023/0047018 | A1* | 2/2023 | Chadwell | B64C 1/1469 |
| 2023/0083772 | A1* | 3/2023 | Chadwell | E05F 15/605 244/206 |
| 2024/0158082 | A1* | 5/2024 | Ruiz Lara | B64D 11/0023 |
| 2025/0108905 | A1* | 4/2025 | Nunes | B64C 1/1469 |

* cited by examiner

DOOR ASSEMBLY WITH AN ENGAGEMENT MECHANISM

TECHNOLOGICAL FIELD

The present disclosure relates generally to the field of aircraft and, more specifically, to a door assembly with an engagement mechanism to secure the door in a closed position.

BACKGROUND

Aircraft have a flight deck that includes flight instruments, instrument panels, and various controls that enable the flight crew to operate the aircraft. The flight deck is positioned towards the front of the aircraft and is usually a separate compartment away from the cabin area. A flight deck door further secures the flight deck and when closed isolates the flight deck from the cabin area.

The flight deck door is closed and locked during flight. This allows the flight crew to concentrate on operating the aircraft and prevents entry of unauthorized persons onto the flight deck. However, the flight deck door may be opened during flight for various reasons. One occurrence is when one of the flight crew use the lavatory which is located in the cabin area of the aircraft. Other occurrences include but are not limited to when food and/or drinks that are prepared in the galley of the cabin area are delivered to the flight crew on the flight deck, and when flight crew leave the flight deck during a break.

Opening of the flight deck door could present an opportunity for an un-authorized person to gain entry to the flight deck. A physically installed system is needed that would inhibit and/or sufficiently delay a person in the cabin area from reaching the flight deck door when the flight deck door is open. The delay in their movement towards the flight deck would allow the flight deck door to be closed and locked prior to the person reaching the door.

SUMMARY

One aspect is directed to a door assembly configured to be mounted in an opening and configured to control movement of persons through the opening. The door assembly comprises a door comprising a first panel and a second panel that are pivotally connected together at inner edges. The door is movable between a folded configuration to enable the movement of persons through the opening and an extended configuration to extend across the opening to prevent the movement of persons through the opening. A translating rod is mounted to the second panel and configured to move between an open position with the first end extending outward beyond the inner edge of the second panel and a closed position with the first end within the inner edge of the second panel. A plunger is mounted to the second panel and comprises a plunger end positioned at a second edge of the second panel with the plunger movable relative to the second panel between a retracted position and an extended position. A gear assembly is mounted to the translating rod and the plunger and configured to move the plunger based on movement of the translating rod. In the folded configuration the first end of the translating rod extends outward beyond the inner edge of the second panel and the plunger is in the retracted position. In the extended configuration the first end of the translating rod is forced inward into the second panel by contact with the first panel and the plunger is in the extended position to be engaged at the opening.

In another aspect, the second panel comprises a front side, a rear side, and an interior space formed between the front side and the rear side with the translating rod, the plunger, and the gear assembly positioned within the interior space.

In another aspect, the first end of the translating rod is positioned along a lateral side of the second panel and the plunger end of the plunger is positioned at a bottom side of the second panel.

In another aspect, each of the translating rod and the plunger comprises straight shapes and wherein the translating rod is positioned perpendicular to the plunger.

In another aspect, the inner edge of the first panel and the inner edge of the second panel contact together in the extended configuration.

In another aspect, the translating rod is mounted to the second panel to move horizontally relative to the second panel and the plunger is mounted to the second panel to move vertically relative to the second panel.

In another aspect, a spring is connected to the translating rod to bias the lever outward from the inner edge of the second panel.

In another aspect, the translating rod and the plunger are mounted to a first side of the second panel.

In another aspect, the plunger is a first plunger and the gear assembly is a first gear assembly with the door assembly further comprising a second plunger mounted to the second panel away from the first plunger and movable relative to the second panel between a retracted position and an extended position and the second gear assembly is mounted to the second panel and configured to move the second plunger between the retracted position and the extended position based on movement of the translating rod.

One aspect is directed to a door assembly configured to be mounted in an opening and configured to control movement of persons through the opening. The door assembly comprises a door comprising a first panel with an inner edge, a second panel with an inner edge, and a hinge that pivotally connects the first panel and the second panel. A translating rod is mounted to the second panel with the translating rod being movable relative to the second panel between a first lateral position with a translating rod end extending outward from the inner edge of the second panel and a second lateral position that is laterally offset from the first lateral position. A plunger is mounted to the second panel and comprises a plunger end positioned at a second edge of the second panel with the plunger movable relative to the second panel between a first vertical position with the plunger end disengaged from the opening and a second lateral position with the plunger end extending outward from the second panel and engaged with the opening. A gear assembly is mounted to the second panel and configured to move the plunger to the first vertical position when the translating rod is in the first horizontal position and to move the plunger to the second vertical position when the translating rod is in the second horizontal position.

In another aspect, the lever end is positioned away from the inner edge of the first panel when the translating rod is in the first lateral position and is in contact with the inner edge of the first panel when the translating rod is in the second lateral position.

In another aspect, the translating rod end is positioned within an interior space of the second panel in the second lateral position.

In another aspect, the door is movable between a folded configuration and an extended configuration with the translating rod end positioned away from the inner edge of the first panel in the folded configuration and in contact with the inner edge of the first panel in the extended configuration.

In another aspect, the translating rod, the plunger, and the gear assembly are positioned within an interior space of the second panel.

In another aspect, the translating rod end is positioned at a lateral side of the second panel and the plunger end is positioned at a bottom side of the second panel.

One aspect is directed to a method of locking a door in an opening. The method comprises: positioning a door in a folded configuration with a first panel and a second panel folded together and a translating rod of the second panel extending outward from an edge of the second panel; contacting the translating rod with the first panel while moving the door across the opening to an extended configuration; unfolding the first panel and the second panel and moving the translating rod laterally relative to the second panel; driving a gear assembly with the translating rod while unfolding the first panel and the second panel; and driving a plunger with the gear assembly and moving a plunger vertically downward into engagement with a floor of the opening.

In another aspect, the method further comprises positioning an end of the lever away from the first panel in the folded configuration.

In another aspect, the method further comprises aligning the first panel and the second panel in a coplanar arrangement in the extended configuration.

In another aspect, the method further comprises contacting an end of the translating rod with an inner edge of the first panel while folding the first panel and the second panel.

In another aspect, the method further comprises mounting the door within an opening in an interior space of an aircraft.

The features, functions and advantages that have been discussed can be achieved independently in various aspects or may be combined in yet other aspects, further details of which can be seen with reference to the following description and the drawings.

DETAILED DESCRIPTION

Figure 1:
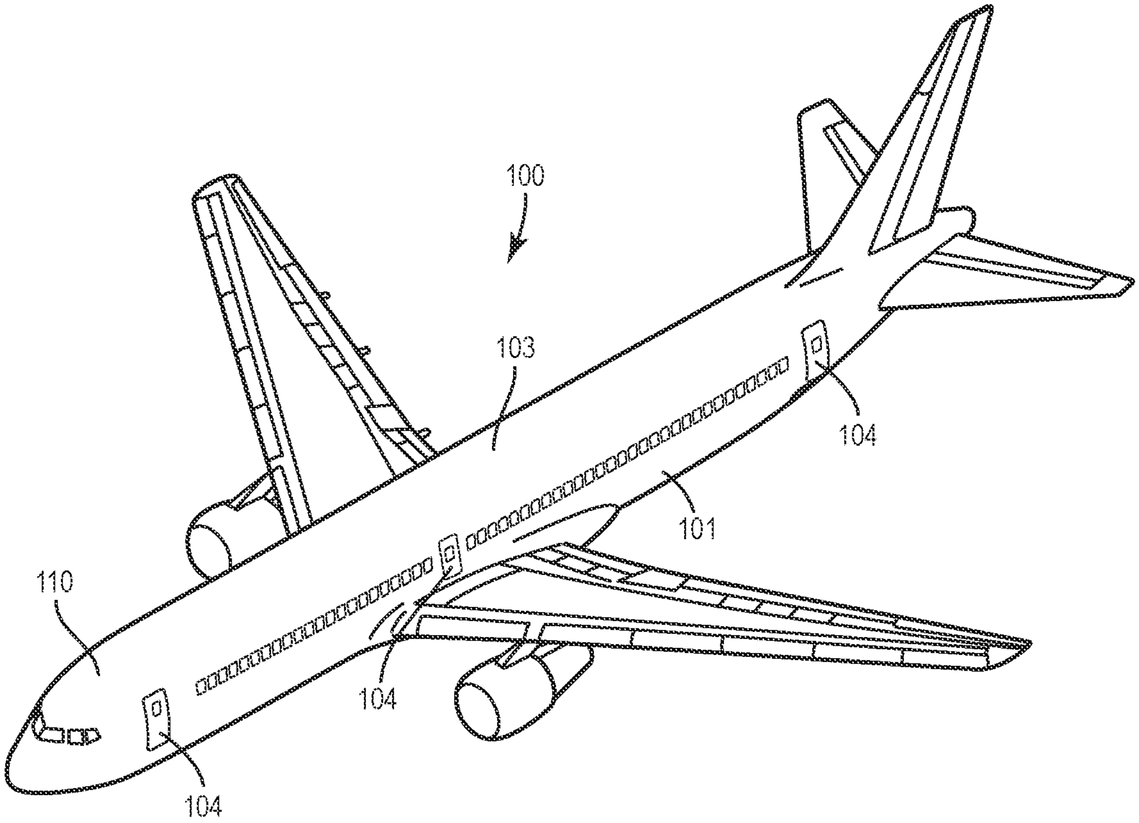
FIG. 1 is an isometric view of an aircraft.
Figure 2:
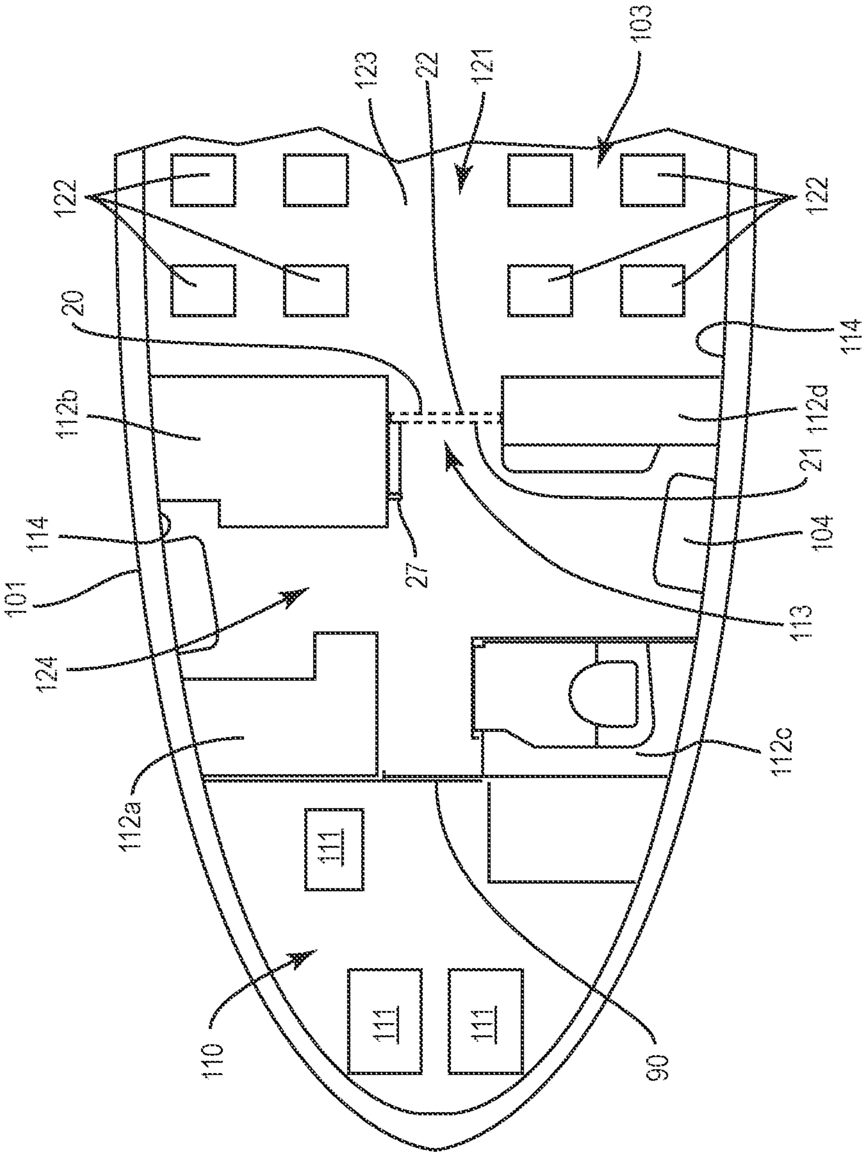
FIG. 2 is a top schematic view of an interior of an aircraft with a barrier door positioned within an opening.

FIGS. 1 and 2 illustrate an aircraft 100 configured to transport passengers. The aircraft 100 includes a fuselage 101 with a flight deck 110 positioned at the front and a cabin area 103 positioned rearward. The cabin area 103 is equipped for accommodating the passengers. The size of the flight deck 110 and the cabin area 103 can vary depending upon the aircraft 100. One or more exterior doors 104 provide for passengers and the flight crew to enter and exit the fuselage 101.

The flight deck 110 includes one or more seats 111 for flight crew including but not limited to the pilot and co-pilot. Various controls and instrument panels (not illustrated) are located for use by the flight crew to control the aircraft 100. A flight deck door 90 separates the flight deck 110 from the cabin area 103. The flight deck door 90 prevents unauthorized persons from entering the flight deck 110 from the cabin area 103. The flight deck door 90 can include a lock to be secured in the closed position.

Monuments 112 are mounted to the structural members of the aircraft 100 within the fuselage 101. The monuments 112 are shaped and sized for a function with examples including but not limited to galleys, lavatories, walls, and stowage units. In some examples, the monuments 112 are shaped and sized to extend from the floor to the ceiling of the cabin area 103, and between a wall 114 of the fuselage 101 to an aisle 123.

The cabin area 103 is positioned along the fuselage 101 rearward of the flight deck 110. The cabin area 103 includes a crew section 124 and a passenger section 121. The crew section 124 is positioned immediately aft of the flight deck 110. In some examples, the crew section 124 is positioned at one of the exterior doors 104 and includes space to allow for passengers to enter and exit the aircraft 100. Additionally or alternatively, the crew section 124 provides an area for the flight crew such as flight attendants to sit during takeoff and landing, for the flight crew to prepare food/drinks, and for passengers to access a lavatory. FIG. 2 includes the crew section 124 having a pair of galley monuments 112*a*, 112*b*, a lavatory monument 112*c*, and a stowage monument 112*d*.

In the example of FIG. 2, the passenger section 121 is positioned aft of the crew section 124. The passenger section 121 is configured to accommodate the passengers and includes seats 122 arranged in rows along one or more aisles 123. In some examples such as a commercial airline, the seats 122 extend throughout the passenger section 121.

The cabin area 103 can include a wide variety of configurations. In some examples the aircraft 100 is used to transport cargo and includes a limited number of seats 122 in the cabin area 103. In some examples the cabin area 103 does not include a crew section 124 with the passenger section 121 including the seats 122 extending directly behind the flight deck 110.

One or more openings 113 form walkways for passengers and flight crew to move within the cabin area 103. In some examples as illustrated in FIG. 2, the openings 113 are formed between the monuments 112. FIG. 2 illustrates a layout with an opening 113 formed between opposing monuments 112*b*, 112*d*. Other examples include openings 113 formed between various components, such as monuments 112, walls 114, and seats 122.

A barrier door 20 extends across the opening 113 to delay and/or prevent a passenger in the passenger section 121 from moving through an opening 113 and gaining access to the flight deck 110. The barrier door 20 is movable between a stowed position (shown in solid lines in FIG. 2) and a deployed position across the opening 113 (shown in dashed lines in FIG. 2). In the stowed position, the barrier door 20 is folded and positioned in a frame 27. This allows for persons to move through the opening 113 such as during boarding and deplaning. In the deployed position, the barrier door 20 is in an extended configuration that extends across the opening 113. This prevents and/or delays a person in the passenger section 121 from moving through the opening 113 and gaining access to the flight deck 110.

Figure 3C:
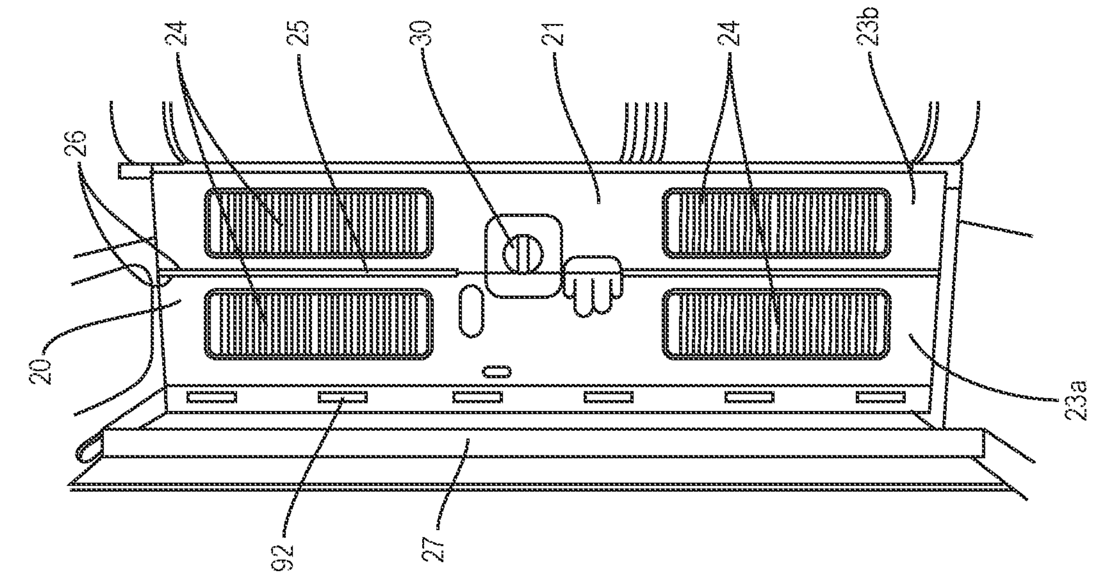
FIGS. 3A-3C are front views of a barrier door moving from a folded configuration in a stowed position to an extended configuration in a deployed position.
Figure 3B:
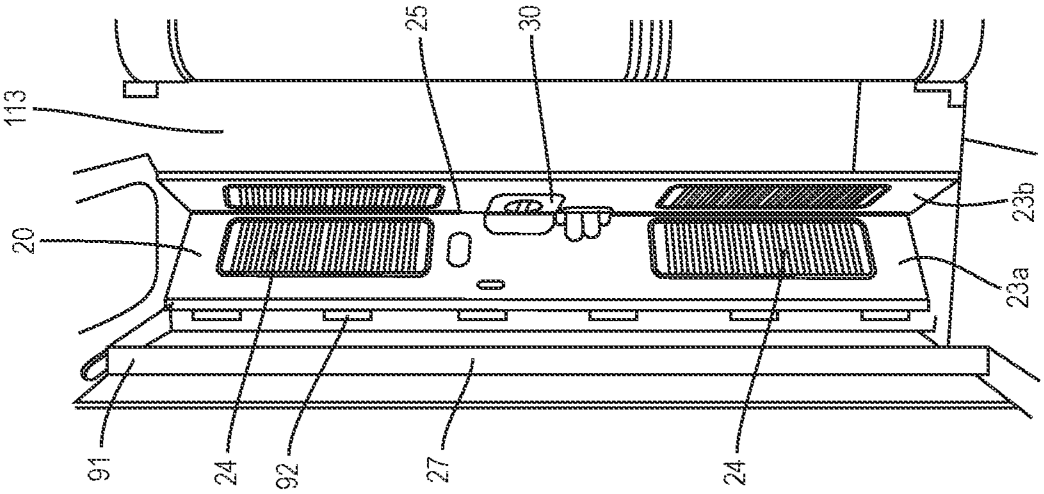
Figure 3A:
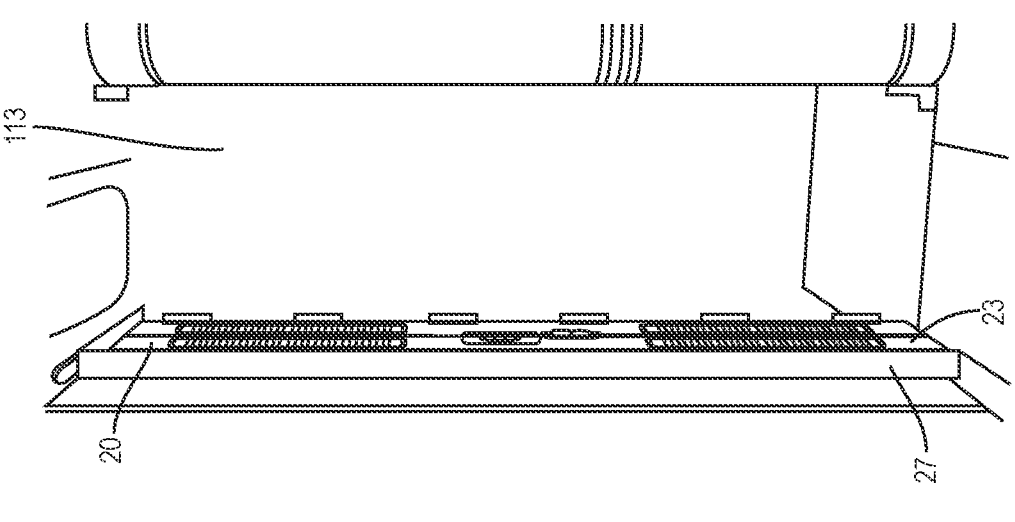

The barrier door 20 is constructed from panels 23 that are hingedly connected together. The number and configuration of the panels 23 can vary. FIGS. 3A, 3B, and 3C illustrate the barrier door 20 moving from a stowed position (FIG. 3A), to a partially deployed position (FIG. 3B) to a deployed position (FIG. 3C). In the stowed position (FIG. 3A) the panels 23 are folded together and out of the opening 113. The panels 23 may be completely out of the opening 113 such as within the frame 27 or folded and stored at one side of the opening 113. In the deployed position (FIG. 3C), the panels 23 are unfolded to extend across the opening 113.

The panels 23 are constructed from a rigid material (e.g., composite material, plastic) and have a fixed shape. The panels 23 can include various shapes and sizes including substantially rectangular as shown. In some examples as illustrated in FIG. 3C, the panels 23 are sized to extend across the entire opening 113 such that there are no gaps when in the deployed position. In other examples, one or more small gaps are formed along the outer edges of the panels 23. In some examples, the panels 23 have the same shape and size to completely overlap in the folded configuration. In other examples the panels 23 include different shapes and/or sizes. One or more windows 24 can be positioned on one or both panels 23. The windows 24 include bars, protective transparent material, or other structures to prevent a passenger from crawling through when the barrier door 20 is closed.

The barrier door 20 includes one or more hinges 25 to enable pivoting movement of the panels 23. In the example best shown in FIGS. 3B and 3C, the panels 23 are connected by a hinge 25 that is positioned at the inner edges 26. The hinge 25 can extend along a single continuous section of the inner edges 26 or can include two or more discrete sections. In some examples, the hinge 25 provides for the panels 23 to be parallel in the folded configuration. This minimizes the overall size of the barrier door 20 when in the stowed position to provide for persons to pass through the opening 113. In some examples, the hinge 25 aligns the panels 23 in a coplanar position in the extended configuration to extend across the opening 113. In other examples the panels 23 are positioned at different relative angular positions in the folded and extended configurations. The hinge 25 can include various configurations, including but not limited to a piano hinge.

In the deployed position, the barrier door 20 includes a front side 21 (i.e., crew side) that faces forward into the crew section 124 and towards the flight deck 110. The barrier door 20 also includes a rear side 22 (i.e., passenger side) that faces rearward towards the passenger section 121. The barrier door 20 is mounted in the opening on a hinge 92. In some examples, the hinge 92 and one or more hinges 25 are positioned on the front side 21 of the barrier door 20 (i.e., in the crew section 124). This allows the barrier door 20 to more effectively resist loads applied from the passenger section 121 toward the flight deck 110.

Figure 4:
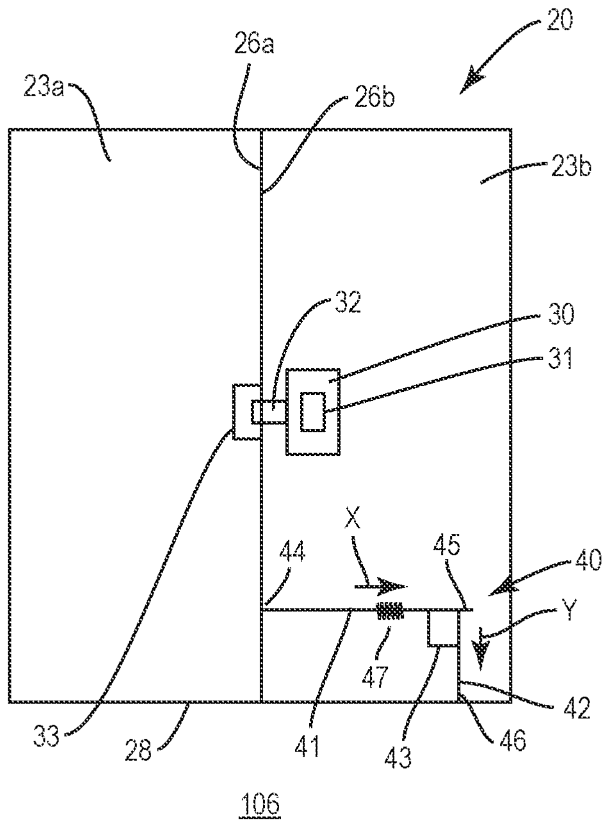
FIG. 4 is a schematic side view of an engagement mechanism mounted to a door.

In some examples, a lock 30 secures the door in the deployed position. As illustrated in FIG. 4 the lock 30 is mounted to one or more of the panels 23. The lock 30 includes a handle 31 and a bolt 32. The panel 23 that does not include the bolt 32 includes a receptacle 33 in the inner edge 26. Rotation of the handle 31 in a first direction causes the bolt 32 to move in the direction or arrow X to a retracted position away from the adjacent panel 23. This unlocked position enables the panels 23 to pivot relative to each other for the barrier door 20 to move between the folded and extended configurations. Rotation of the handle 31 in a second direction causes the bolt 32 to move to an extended position outward from the panel 23. When the barrier door 20 is in the extended configuration across the opening 113, this rotation causes the bolt 32 to move into the receptacle 33. This secures or locks the two panels 23 together to prevent relative pivoting movement and securing the barrier door 20 in the extended configuration across the opening 113.

In some examples, the handle 31 includes a first handle on the front side 21 of the barrier door 20 and a second handle on the rear side 22. This provides for access by both of the crew member in the crew section 124 and a passenger in the passenger section 121. In other examples, the handle 31 includes a single handle on the front side 21.

The barrier door 20 is equipped with an engagement mechanism 40. The engagement mechanism 40 includes a translating rod 41, a plunger 42, and a gear assembly 43. The engagement mechanism 40 functions to further secure the barrier door 20 in the deployed position across the opening 113. The engagement mechanism 40 is configured to move in the direction of arrow Y to a locked position when the panels 23 align in the extended configuration and move to the unlocked position when the panels are in the folded configuration.

The translating rod 41 includes an elongated shape with a first end 44 and opposing second end 45. In some examples, the translating rod 41 is single elongated piece such as a rod. Other examples include the translating rod 41 constructed from multiple sections. The translating rod 41 is constructed from various materials, such as metal, wood, and rigid plastic. In one example, the translating rod 41 is mounted within the interior of the panel 23 (e.g., panel 23*b* in FIG. 4). In some examples, the translating rod 41 is positioned in an interior space of the panel 23 that is formed between a front side and a rear side of the panel. An end of the translating rod 41 extends outward from the interior space which positions the translating rod 41 for contact by the opposing panel 23. Positioning the translating rod 41 in the interior space also protects the translating rod 41 from tampering and/or being damaged as persons walk through the opening 113. The translating rod 41 can be positioned at different locations along the height of the barrier door 20. FIG. 4 illustrates an example with the engagement mechanism 40 positioned in a lower section below the lock 30. In other examples, the translating rod 41 is positioned at an upper section of the barrier door 20.

Figure 5A:
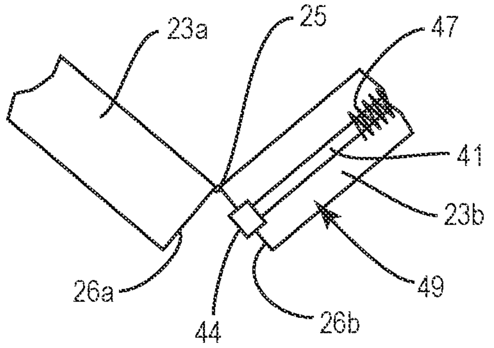
FIG. 5A is a schematic top view of panels in a folded configuration and with a translating rod in a first position.

The translating rod 41 is movable relative to panel 23 to which it is mounted. In a first position, the translating rod 41 extends partially outward from an inner edge of the panel 23. In a second position, the translating rod 41 is shifted inward relative to the panel 23. FIG. 5A illustrates the translating rod 41 mounted within the interior space 49 of the panel 23*b*.

The translating rod 41 is in this first position when the panels 23 are in a folded position such as either a partially folded position or a fully folded position. The translating rod 41 is positioned relative to the panel 23*b* with the first end 44 extending outward from the inner edge 26*b*. In the folded configuration, the opposing panel 23*a* is positioned with its inner edge 26*a* spaced away from the translating rod 41.

In some examples, a spring 47 acts on the translating rod 41 and biases it towards the first position with the first end 44 extending outward beyond the inner edge 26*b*. In some examples, the first end 44 extends outward through an opening in the inner edge 26*b*. The translating rod 41 includes a flange (not illustrated) that contacts against the inner edge 26*b* to control the extent to which the first end 44 can extend outward.

Figure 5B:
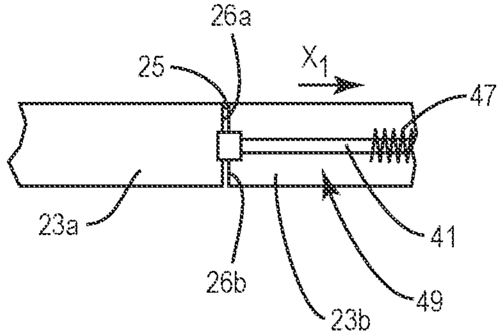
FIG. 5B is a schematic top view of the panels of FIG. 5B in an extended configuration and with the translating rod in a second position.

FIG. 5B illustrates the barrier door 20 in the extended configuration with the panels 23*a*, 23*b* aligned in a coplanar arrangement. The inner edge 26*a* of panel 23*a* contacts against the first end 44. This contact forces the translating rod 41 to move to the second position inward within the panel 23*b*. The movement of the translating rod 41 coincides with the folding movement of the panels 23*a*, 23*b* as the force of the panel 23*a* acting on the translating rod 41 applies a driving force that moves the translating rod 41 to the second position.

The plunger 42 includes an elongated shape and extends between the translating rod 41 and the lower edge 28 of the barrier door 20. The plunger 42 is also movable relative to the panel 23. In a first position, the plunger 42 is positioned with an engagement end 46 disengaged from the opening 113. This can include the end 46 fully retracted within the panel 23 or extending outward a limited amount so as not to engage. In a second position, the plunger 42 is shifted outward for the end 46 to extend outward and engage with the opening 113. The plunger 42 has a rigid construction and can include various materials including but not limited to metal, wood, and plastic. The plunger 42 can be constructed from one or more sections.

In some examples, each of the translating rod 41 and plunger 42 are substantially straight. The translating rod 41 is configured to move laterally relative to the panel 23 and the plunger 42 is configured to move vertically relative to the panel 23. In some examples, the translating rod 41 is aligned substantially perpendicular to the plunger 42. In other examples, the alignment is non-perpendicular.

The gear assembly 43 connects to both the translating rod 41 and the plunger 42. The gear assembly 43 is configured to drive the plunger 42 between the positions based on the movement of the translating rod 41. In some examples, the gear assembly 43 includes a rack and pinion gear system. In one example, each of the translating rod 41 and plunger 42 include a toothed rack. A gear is positioned adjacent to and engages with both racks. Movement of the translating rod 41 causes the gear to rotate which in turn causes movement of the plunger 42. Movement of the translating rod 41 in a first direction, cause the plunger 42 to move in a first direction (e.g., to extend outward from an edge of the barrier door 20). Movement in an opposing second direction causes the plunger 42 to move in a second direction (e.g., to retract inward from the edge).

In another example, the gear assembly 43 includes mating gears positioned on the translating rod 41 and plunger 42. The plunger 42 is threaded and extends through a central opening in a gear that is connected to the translating rod 41. Movement of the translating rod 41 causes the gear to rotate which in turn causes the plunger 42 to move due to the threading of the gear moving along the length of the plunger 42. Other examples of transferring movement of the translating rod 41 to movement of the plunger 42 include but are not limited to gearless linkage mechanisms or cranks such as bell cranks, or cable-operated mechanisms.

Figure 6:
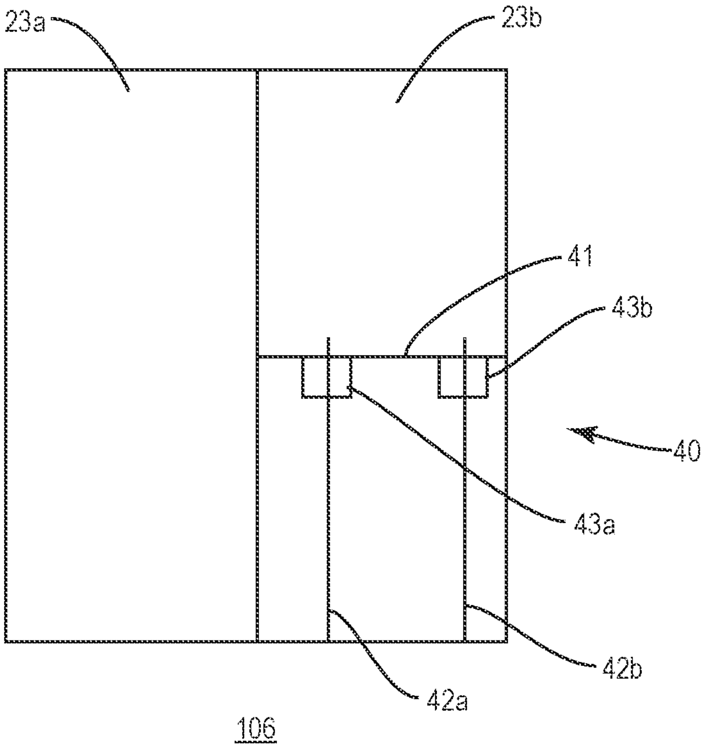
FIG. 6 is a front schematic view of an engagement mechanism having a pair of plungers and a pair of gear assemblies.

In some examples as illustrated in FIG. 4, the engagement mechanism 40 includes a single plunger 42. In other examples, the engagement mechanism 40 includes multiple plungers 42. FIG. 6 illustrates an example having a pair of plungers 42*a*, 42*b* each connected to the translating rod 41 through a respective gear assembly 43*a*, 43*b*. Movement of the translating rod 41 is transferred to the plungers 42*a*, 42*b* through the respective gear assembly 43*a*, 43*b*. In engagement mechanisms 40 having multiple plungers 42, the different plungers 42 and gear assemblies 43 can be the same or different. Further, the multiple plungers 42 can be positioned in close proximity along the bottom edge of the panel 23 or can be spaced apart.

Figure 7A:
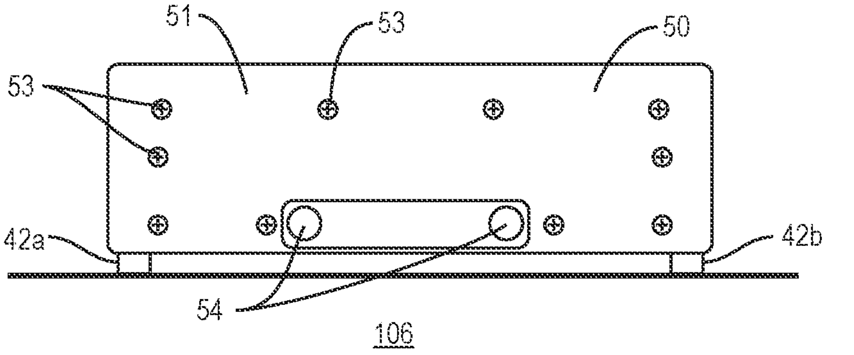
FIG. 7A is a front view of a front side of a housing.
Figure 7B:
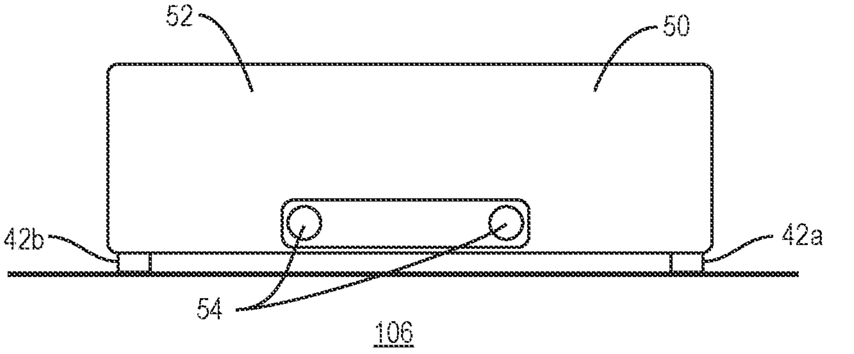
FIG. 7B is a rear view of a rear side of the housing of FIG. 7A.

In some examples, the engagement mechanism 40 includes a housing 50 configured to be mounted at the bottom edge of the barrier door 20. FIGS. 7A and 7B illustrate a housing 50 that includes a front section 51 and a rear section 52. The housing 50 is mounted to the barrier door 20 through anchors 53. In some examples, the anchors 53 are inserted from just the front side 21 of the barrier door 20 to prevent tampering by a passenger.

Fasteners 54 secure together the front section 51 and the rear section 52. The fasteners 54 include a threaded section and a head. In the event the engagement mechanism 40 becomes stuck in the engaged position, a crew member from the front side 21 or a passenger from the rear side 22 of the barrier door 20 can unscrew the fasteners 54 and access the one or more plungers 42. The one or more plungers 42 can be moved from the engaged position to the disengaged position to enable the barrier door 20 to be opened. Each of the fasteners 54 is threaded which results in a delay in opening the housing 50 and disengaging the one or more plungers 42. This delay prevents a passenger from quickly bypassing the engagement mechanism 40 and immediately opening the barrier door 20. The time necessary for a passenger to unscrew the fasteners 54 and disengage the one or more plungers 42 provides time for crew members to move to the flight deck 110 and close and lock the flight deck door 90.

Figure 8:
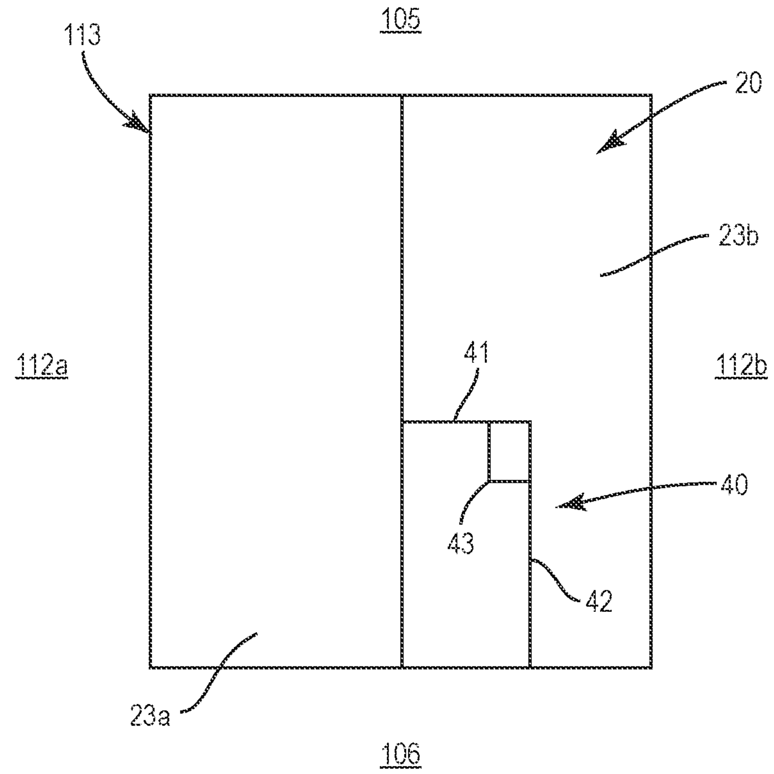
FIG. 8 is a front schematic view of a barrier door mounted directly into an opening.

The barrier door 20 is mounted in the opening 113 in a variety of different manners. FIG. 8 includes an example with the barrier door 20 mounted to the floor 106 at the opening 113. In some examples, the barrier door 20 is also mounted to the ceiling 105. The barrier door 20 is not mounted to the lateral sides formed by monuments 112*a*, 112*b*. The plunger 42 of the engagement mechanism 40 extends outward to engage with the floor 106.

Figure 9:
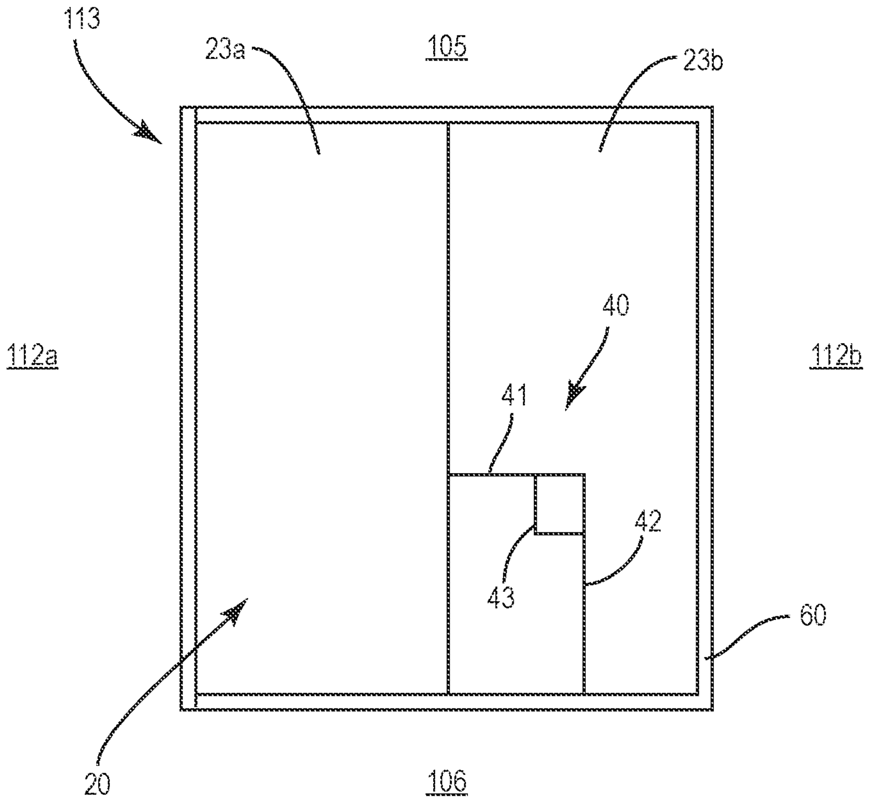
FIG. 9 is a front schematic view of a barrier door assembly that includes a frame and configured to be mounted in an opening.

In some examples, the barrier door 20 is mounted to a frame 60. The frame 60 is configured to mount to one or more of the floor 106, ceiling 105, and lateral sides of the opening 113. The frame 60 can extend completely or partially around the barrier door 20. FIG. 9 illustrates an example with the frame 60 extending completely around the barrier door 20.

Figure 10:
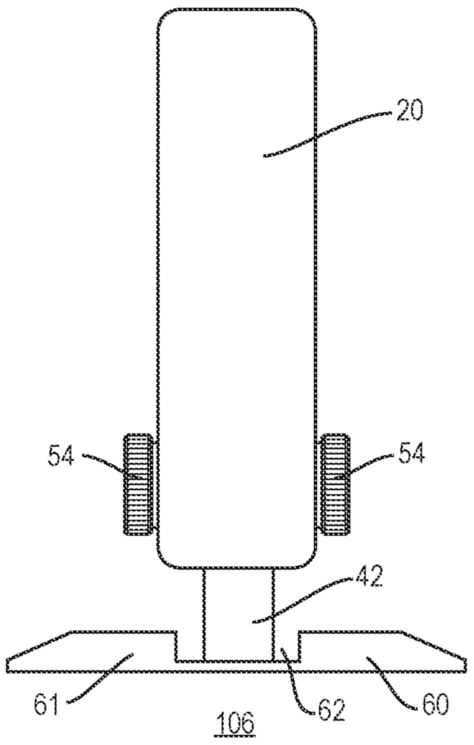
FIG. 10 is a side view of a plunger extending outward from a bottom side of a door.

In some examples, the frame 60 includes a threshold 61 configured to be mounted to the floor 106. As illustrated in FIG. 10, the threshold 61 includes one or more receptacles 62 that receive the one or more plungers 42 in the engaged position. The receptacles 62 include sidewalls that prevent the plunger 42 from escaping while in the deployed position. In one example as illustrated in FIG. 10, the sidewalls have straight sidewalls. In another example, the sidewalls have a dovetail configuration. In some examples, the frame 60 includes just a threshold 61. In other examples, the frame 60 includes the threshold 61 that extends along the bottom of the barrier door 20 and one or more sections that extend along at least one of the lateral sides and the top side of the barrier door 20.

In other examples, the barrier door 20 is mounted to one or more of the monuments 112.

In some examples, the barrier door 20 is positioned completely out of the opening 113 when stowed in the folded configuration. This protects the panels 23 from being damaged such as by being hit by luggage carried by passengers, galley carts being pushed through the opening 113, and persons as they walk through the opening 113. In other examples, the barrier door 20 is at least partially within the opening 113 in the stowed position.

Figure 11:
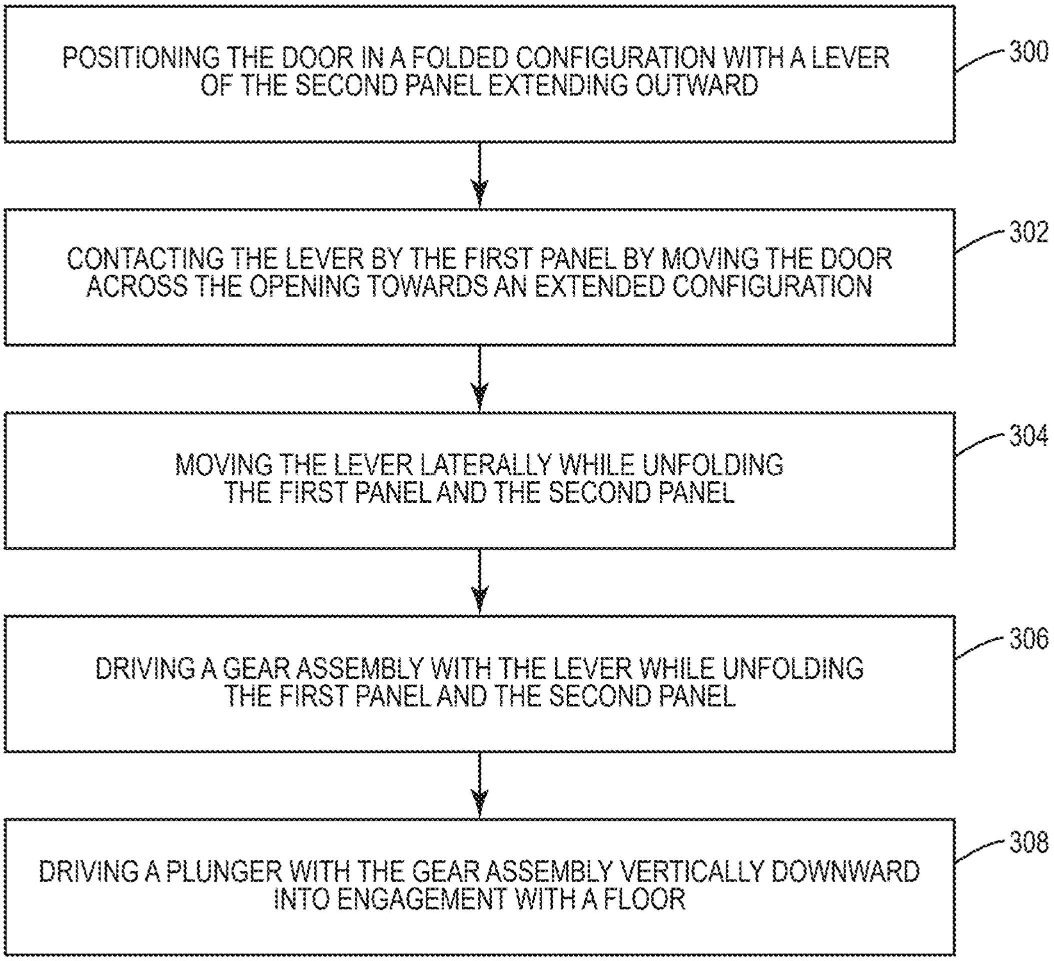
FIG. 11 is a flowchart diagram of a method of locking a door in an opening.

FIG. 11 illustrates a method of locking a door 20 in an opening 113. The method includes positioning the door 20 in a folded configuration with a first panel 23*a* and a second panel 23*b* folded together (block 300). A translating rod 41 of the second panel extends outward from an edge of the second panel 23*b*. The translating rod 41 is contacted by the first panel 23 by moving the door 20 across the opening 113 towards an extended configuration (block 302). The translating rod 41 is moved laterally relative to the second panel while unfolding the first panel 23*a* and the second panel 23*b* (block 304). A gear assembly 43 is driven with the translating rod 41 while unfolding the first panel 23*a* and the second panel 23*b* (block 306). A plunger 42 is driven with the gear assembly 43 vertically downward into engagement with a floor 106 of the opening 113 (block 308).

Figure 12:
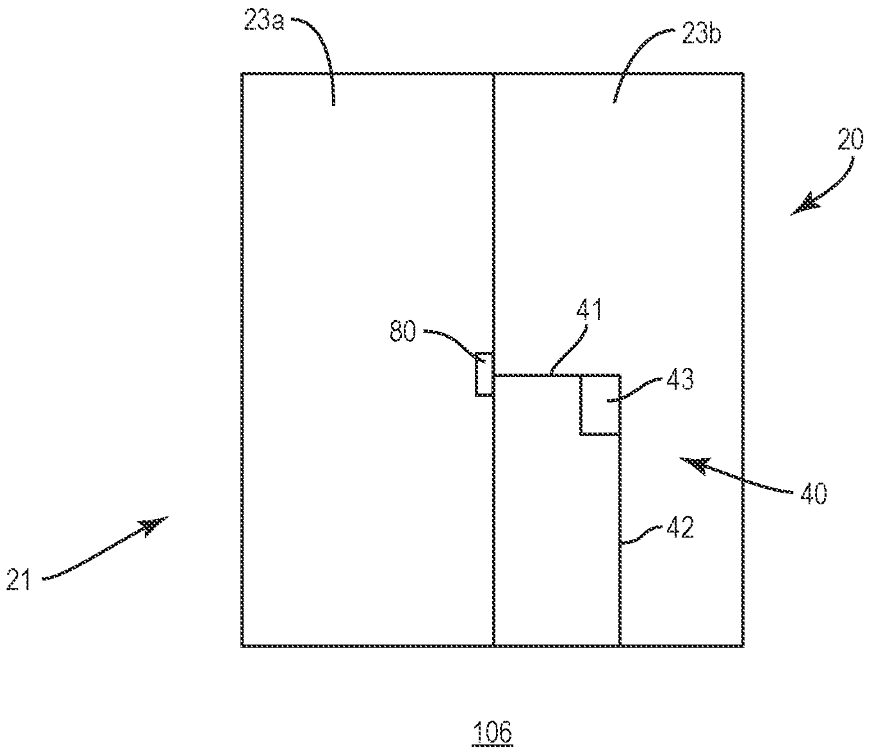
FIG. 12 is a front schematic view of an engagement mechanism with a translating rod mounted on a front side of a panel.

In some examples as illustrated in FIGS. 5A and 5B, the translating rod 41, plunger 42, and gear assembly 43 are positioned within the interior of the panel 23. In other examples, the plunger 42 is mounted to the front side of the panel 23. As illustrated in FIG. 12, the translating rod 41 is exposed on the front side 21 of the panel 23*b*. A contact member 80 is mounted to the front side of the adjacent panel 23*a*. The contact member 80 contacts against the end of the translating rod 41 when moving the panels 23 to the extended configuration. This contact drives the translating rod 41 laterally relative to the panel 23*b* to drive the gear assembly 43 and plunger 42. In some examples, the plunger 42 and gear assembly 43 are also mounted on the front side of the panel 23*b*. In other examples, one or both of the plunger 42 and gear assembly 43 are mounted within the panel 23*b*.

In some examples, the barrier door 20 includes a lock 30 to engage the panels 23 and prevent their movement between the folded and extended configurations. In other examples, the barrier door 20 does not include a lock 30. The barrier door 20 is maintained in the extended configuration by the engagement mechanism 40.

In one example as illustrated in FIG. 4, the translating rod 41 extends outward from the lateral side of the panel 23 and the plunger 42 extends outward from the bottom side of the panel 23. In other examples, one or both of the translating rod 41 and plunger 42 extend outward from different sides of the panel 23. In one specific example, the plunger 42 extends outward from a top side of the panel 23 and engages with a top of the opening 113. In another example, the plunger 42 extends outward from the outer lateral side of the panel 23.

One application of the engagement mechanism 40 is for a barrier door 20 for use in an aircraft 100. The engagement mechanism 40 can be used in other applications in which a door 20 is secured in a locked position across an opening. Examples include but are not limited to other openings within an aircraft, a door within a building, and an exterior door.

The barrier door 20 includes multiple panels 23 that are connected together by hinges. In some examples, the barrier door 20 includes two panels 23 that are connected along inner edges by a hinge 25. In other examples, the barrier door 20 includes three or more panels 23 that are connected by hinges 25.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A door assembly configured to be mounted in an opening and configured to control movement of persons through the opening, the door assembly comprising:

a door comprising a first panel and a second panel each with an inner edge that faces into a center of the opening and an outer edge that faces outward away from the center when the door is in a closed position, the first panel and the second panel that are pivotally connected together at the inner edges, the door is movable between a folded configuration to enable the movement of persons through the opening and an extended configuration to extend across the opening to prevent the movement of persons through the opening;

a translating rod mounted to the second panel and configured to move between an open position with the first end extending outward beyond the inner edge of the second panel and the closed position with the first end within the inner edge of the second panel;

a plunger mounted to the second panel and comprising a plunger end positioned at a second edge of the second panel, the plunger movable relative to the second panel between a retracted position and an extended position;

a gear assembly mounted to the translating rod and the plunger and configured to move the plunger based on movement of the translating rod;

wherein in the folded configuration the first end of the translating rod extends outward beyond the inner edge of the second panel and the plunger is in the retracted position; and wherein in the extended configuration the first end of the translating rod is forced inward into the second panel by contact with the first panel and the plunger is in the extended position to be engaged at the opening.

2. The door assembly of claim 1, wherein the second panel comprises a front side, a rear side, and an interior space formed between the front side and the rear side with the translating rod, the plunger, and the gear assembly positioned within the interior space.

3. The door assembly of claim 1, wherein the first end of the translating rod is positioned along a lateral side of the second panel and the plunger end of the plunger is positioned at a bottom side of the second panel.

4. The door assembly of claim 1, wherein each of the translating rod and the plunger comprises straight shapes and wherein the translating rod is positioned perpendicular to the plunger.

5. The door assembly of claim 1, wherein the translating rod is mounted to the second panel to move horizontally relative to the second panel and the plunger is mounted to the second panel to move vertically relative to the second panel.

6. The door assembly of claim 1, further comprising a spring connected to the translating rod to bias the translating rod outward from the inner edge of the second panel.

7. The door assembly of claim 1, wherein the translating rod and the plunger are mounted to a first side of the second panel.

8. The door assembly of claim 1, wherein the plunger is a first plunger and the gear assembly is a first gear assembly, the door assembly further comprising a second plunger mounted to the second panel away from the first plunger and movable relative to the second panel between a retracted position and an extended position and a second gear assembly is mounted to the second panel and configured to move the second plunger between the retracted position and the extended position based on movement of the translating rod lever.

9. A door assembly configured to be mounted in an opening and configured to control movement of persons through the opening, the door assembly comprising:

a door comprising:

a first panel with an inner edge positioned at a central section of the opening when the door is in a closed position;

a second panel with an inner edge positioned at the central section of the opening when the door is in the closed position;

a hinge that pivotally connects the first panel and the second panel along the inner edges and with the inner edges being adjacent to one another;

a translating rod mounted to the second panel, the translating rod being movable relative to the second panel between a first lateral position with a translating rod end extending outward from the inner edge of the second panel and a second lateral position that is laterally offset from the first lateral position;

a plunger mounted to the second panel and comprising a plunger end positioned at a second edge of the second panel, the plunger movable relative to the second panel between a first vertical position with the plunger end disengaged from the opening and a second lateral position with the plunger end extending outward from the second panel and engaged with the opening;

a gear assembly mounted to the second panel and configured to move the plunger to the first vertical position when the translating rod is in the first horizontal position and to move the plunger to the second vertical position when the translating rod is in the second horizontal position; and a housing that comprises a first section and a second section that are mounted to the second panel at the second edge and which extend over the plunger, the housing mounted to the second panel with threaded fasteners with one or more of the threaded fasteners mounted from a front side of the second panel and one or more of the threaded fasteners mounted from a rear side of the second panel to enable the first section of the housing to be removed from the second panel from the front side and the second section of the housing to be removed from the second panel from the rear side.

10. The door assembly of claim 9, wherein the translating rod end is positioned away from the inner edge of the first panel when the translating rod is in the first lateral position and is in contact with the inner edge of the first panel when the translating rod is in the second lateral position.

11. The door assembly of claim 10, wherein the translating rod end is positioned within an interior space of the second panel in the second lateral position.

12. The door assembly of claim 10, wherein the door is movable between a folded configuration and an extended configuration with the translating rod end positioned away from the inner edge of the first panel in the folded configuration and in contact with the inner edge of the first panel in the extended configuration.

13. The door assembly of claim 9, wherein the translating rod, the plunger, and the gear assembly are positioned within an interior space of the second panel.

14. The door assembly of claim 9, wherein the translating rod end is positioned at a lateral side of the second panel and the plunger end is positioned at a bottom side of the second panel.

15. A method of locking a door in an opening, the method comprising:

positioning a door in a folded configuration with a first panel and a second panel folded together and an end of a translating rod of the second panel extending outward from an edge of the second panel;

contacting the translating rod with the first panel while moving the door across the opening to an extended configuration and moving the end of the translating rod towards a center of the opening;

unfolding the first panel and the second panel and moving the translating rod laterally relative to the second panel;

positioning a housing that extends over a plunger along the door with a front section of the housing that is connected to the door with first fasteners accessible from a front side of the door and a rear section of the housing connected to the door with second fasteners accessible from a rear side of the door;

driving a gear assembly with the translating rod and unfolding the first panel and the second panel; and driving the plunger with the gear assembly and moving a plunger vertically downward into engagement with a floor of the opening.

16. The method of claim 15, further comprising positioning an end of the translating rod away from the first panel in the folded configuration.

17. The method of claim 15, further comprising aligning the first panel and the second panel in a coplanar arrangement in the extended configuration.

18. The method of claim 15, further comprising contacting an end of the translating rod with an inner edge of the first panel while folding the first panel and the second panel.

19. The method of claim 15, further comprising mounting the door within the opening in an interior space of an aircraft.

20. The door assembly of claim 1, further comprising a pivoting hinge at the inner edges of the first panel and the second panel to connect together the first panel and the second panel.

* * * * *